(12) United States Patent
Yagnik

(10) Patent No.: US 8,234,265 B1
(45) Date of Patent: Jul. 31, 2012

(54) CONTENT SELECTION DATA EXPANSION

(75) Inventor: Niyati Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 12/620,707

(22) Filed: Nov. 18, 2009

(51) Int. Cl.
*G06F 17/30* (2006.01)

(52) U.S. Cl. ........................................ 707/708

(58) Field of Classification Search .............. 707/3, 708; 705/8; 709/223
See application file for complete search history.

(56) References Cited

U.S. PATENT DOCUMENTS

| | | | |
|---|---|---|---|
| 2005/0222981 A1* | 10/2005 | Lawrence et al. | 707/3 |
| 2006/0069616 A1 | 3/2006 | Bau | |
| 2008/0154684 A1* | 6/2008 | Kniaz et al. | 705/8 |
| 2008/0270364 A1* | 10/2008 | Bayardo et al. | 707/3 |
| 2009/0006207 A1 | 1/2009 | Datar et al. | |
| 2009/0192986 A1 | 7/2009 | Garg et al. | |
| 2011/0016005 A1 | 1/2011 | Li et al. | |

* cited by examiner

*Primary Examiner* — Etienne Leroux
(74) *Attorney, Agent, or Firm* — Fish & Richardson P.C.

(57) ABSTRACT

Methods, systems, and apparatus, including computer programs encoded on a computer storage medium, for generating and applying query rules. Search queries that are received during user sessions are analyzed to generate query rules that specify a high-performing query that can be used to identify content in response to receipt of a low-performing query. The query rules can be generated by identifying queries that are received in a same user sub-session and defining initial query pairs that each have a high-performing query and a low-performing query from the same user sub-session. The initial query pairs that are identified in a threshold number of user sub-sessions are classified as reference query pairs with which query rules are defined. Query rules are made available to a search system, advertisement management system, or another query processing system for identifying content responsive to search queries.

19 Claims, 5 Drawing Sheets

CONTENT SELECTION DATA EXPANSION

BACKGROUND

This specification relates to data processing and content selection.

The Internet enables access to a wide variety of resources. For example, video, audio, webpages directed to particular subject matter, news articles, images, and other resources are accessible over the Internet. The wide variety of resources that are accessible over the Internet has enabled opportunities for advertisers to provide targeted advertisements with the resources. For example, an advertisement can be targeted for presentation with resources directed to subject matter to which the advertisement is relevant.

The subject matter to which an advertisement is relevant can be identified from targeting keywords that are associated with the advertisement, and advertisements can be selected for presentation when resources relevant to the targeting keyword are provided. For example, advertisements associated with a targeting keyword "basketball" can be provided with a search results webpage that is provided in response to a search query "basketball," or a search query that is identified as relevant to the targeting keyword "basketball."

Similarly, resources available over the Internet that are relevant to a search query can be provided to a user in response to the search query. For example, resource keywords that identify topics to which content of a resource belongs, can be used to identify web pages that are relevant to the search query "basketball."

There are many different words or phrases, referred to collectively throughout this document as terms, that can be provided as search queries to request content that is relevant to the same topic. Additionally, some search queries may be provided by different users requesting content that is relevant to several different topics. Therefore, it can be difficult to select content for each search query provided by a user based only on the search query that is provided by a user.

SUMMARY

In general, one innovative aspect of the subject matter described in this specification can be embodied in methods that include the actions of receiving, in a data processing device, user session data for a plurality of user sessions, the user session data for each user session including search queries and corresponding content performance data for the user session, the content performance data representing user actions in response to content being provided responsive to the search queries; segmenting, by a data processing device, the user session data into session subsets based on a session delineator, each session subset including search queries that were received within a threshold proximity of other search queries in the session subset, the threshold proximity being specified by the session delineator; classifying, by a data processing device, each search query as belonging to a particular query performance group based on a content performance measure corresponding to the search query, the content performance measure being computed based on the content performance data corresponding to the search query; selecting, by a data processing device, reference query pairs, each reference query pair including a first search query from a first query performance group and a second query from a second query performance group, each reference query pair being a query pair that is defined for at least a threshold number of session subsets; generating, by a data processing device, query rules based on the reference query pairs, each query rule specifying that content responsive to a second query from a reference query pair be identified in response to receipt of a first query from the reference query pair; and providing, by a data processing device and based on the query rules, content responsive to a second query specified by a query rule in response to receipt of a first query specified by the query rule. Other embodiments of this aspect include corresponding systems, apparatus, and computer programs, configured to perform the actions of the methods, encoded on computer storage devices.

These and other embodiments can each optionally include one or more of the following features. The methods can include computing, for each search query, a content performance measure based on a number of selections of content provided responsive to the search query, the number of selections being computed based on the content performance data corresponding to the search query. Computing a content performance measure can include computing a selection rate for content provided responsive to the search query. Computing a selection rate can include computing, for each search query, a normalized selection rate based on a number of instances of the search query and presentation characteristics for the content. Computing a normalized selection rate can include normalizing the selection rate based on presentation positions for the content, each presentation position having a corresponding normalization factor with which the normalized selection rate is computed for content presented in the presentation position.

Classifying each search query to a particular query performance group can include classifying each search query having an advertisement performance measure that meets an advertisement performance threshold as a high-performing query and as belonging to a high-performing query group; and classifying each search query having an advertisement performance measure that is less than the advertisement performance threshold as a low-performing query and as belonging to a low-performing query group.

Selecting reference query pairs can include defining, for each session subset, initial query pairs, each initial query pair including a high-performing query and a low-performing query; determining, for each initial query pair, a number of session subsets for which the initial query pair is defined; and selecting, as reference query pairs, initial query pairs that are defined for at least a threshold number of session subsets.

Segmenting the user session data into session subsets can include selecting, for each user session, a session specific delineator specifying a threshold proximity with which the session subsets for the user session are defined; and segmenting the user session data for the user session based on the session specific delineator.

Selecting a session specific delineator can include identifying user session data for user sessions corresponding to a same unique identifier; and computing a session delineator for user session data corresponding to the same unique identifier based on an analysis of the user session data.

Computing the session delineator can include computing an average elapsed time between receipt of queries corresponding to the unique identifier, and wherein segmenting the user session data based on the session specific delineator comprises grouping search queries that correspond to the unique identifier and are received within a query period of each other into a same session subset.

Particular embodiments of the subject matter described in this specification can be implemented so as to realize one or more of the following advantages. Additional queries relevant to content being requested by users are inferred based on query rules that identify high-performance queries that were previously received within a same user sub-session as low-performing queries that are later received as search queries. The relevance of content provided in response to a low-performing query can be enhanced from the user's perspective by including content that is relevant to a high-performing query that is received within a same user sub-session as the low-performing query. Content responsive to the high-performing query and that may not have been identified for presentation based on a low-performing query can be provided to a user device in response to receiving the low-performing query as a search query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
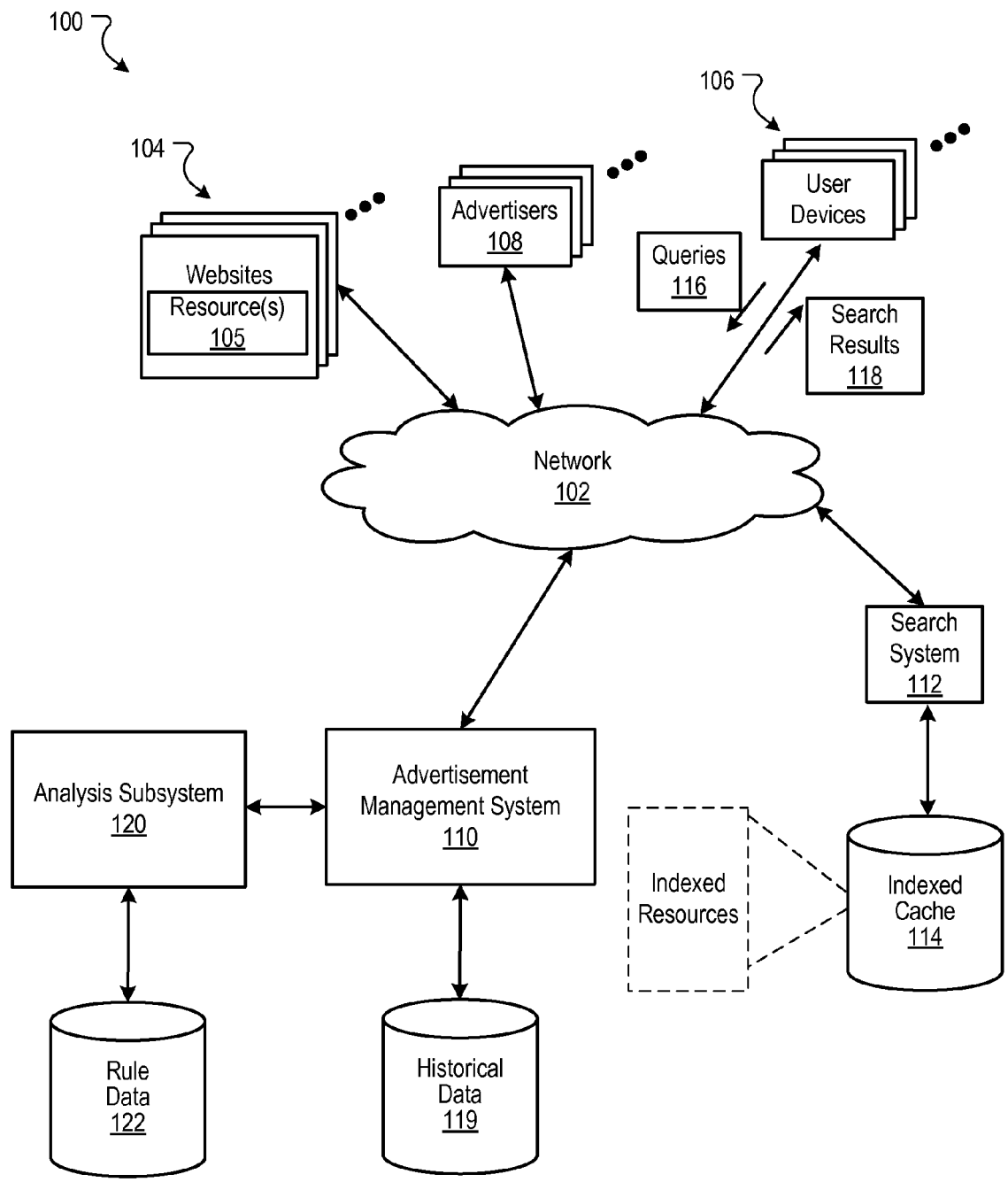
FIG. 1A is a block diagram of an example environment in which an advertisement management system manages advertising services.

A query analysis subsystem ("analysis subsystem") analyzes search queries that are received during user sessions to generate query rules that can be used to identify content that may not have been identified for a received search query. For example, the query rules can specify one or more terms that can be used, in addition to a search query received from a user device, to identify content responsive to the search query.

The analysis subsystem can generate query rules, for example, by identifying queries that are received in a same user sub-session (i.e., a specified portion of a user session) and defining these queries as requesting content to satisfy the same user informational need due to the proximity with which the queries were received. For example, queries that are received closer in time to each other are more likely requesting content to satisfy the same informational need than queries that are received further apart in time.

The analysis subsystem defines initial query pairs using queries that are received during a same user sub-session, with each initial query pair being a high-performing query and a low-performing query from the same user sub-session. A high-performing query is a query having at least a threshold measure of performance, while a low-performing query is a query having less than the threshold measure of performance. Content selection rate is a measure of user selections of content provided in response to a query and is an example performance measure that can be used to identify high-performing queries and low performing queries. For example, a high performing query can have a content selection rate (e.g., advertisement or search result selection rate) that exceeds a threshold selection rate, while the low-performing query can have a content selection rate that is less than the threshold selection rate.

The analysis subsystem classifies initial query pairs that are identified in a threshold number of user sub-sessions as reference query pairs with which query rules are defined. The query rules specify a high-performing query that can be used to identify content in response to receipt of a low-performing query. Once the query rules are defined, the analysis subsystem can make them available to a search system, advertisement management system, or another query processing system for identifying content responsive to search queries.

In some implementations, an analysis subsystem is implemented as an element of a query processing system that operates in an online environment. In other implementations, the analysis subsystem is implemented in a processing system separate from the query processing system. In these implementations, the analysis subsystem communicates over a network or directly with the query processing system. The analysis subsystem is described throughout this document as being a subsystem of an advertisement management system and with reference to using advertisement performance metrics for the search queries to generate query rules. However, the description is applicable to other implementations and using performance measures for other content.

FIG. 1A is a block diagram of an example environment 100 in which an advertisement management system 110 manages advertising services. The example environment 100 includes a network 102 such as a local area network (LAN), wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that manages and/or owns the website 104.

A resource 105 is any data that can be provided over the network 102 and that is associated with a resource address. Resources include HTML pages, word processing documents, portable document format (PDF) documents, images, video, and feed sources, to name only a few. The resources can include content, e.g., words, phrases, images and audio that may include embedded information (such as meta-information in hyperlinks) and/or embedded instructions (such as JavaScript scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window) in which advertisements can be presented. These specified portions of the resource or user display in which advertisements can be presented are referred to as advertisement slots.

To facilitate searching of these resources, a search system 112 identifies the resources by crawling and indexing the resources provided by the publishers on the websites 104. The indexed and, optionally, cached copies of the resources are stored in an indexed cache 114.

User devices 106 submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages.

A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the advertisement management system 110 receives a request for advertisements to be provided with the resource or search results. The request for advertisements can include characteristics of the advertisement slots that are defined for the requested resource or search results page. Therefore, the advertisement management system 110 can use the characteristics to select advertisements for presentation in the advertisement slots.

For example, a reference (e.g., URL) to the resource for which the advertisement slot is defined, a size of the advertisement slot, and/or media types that are available for presentation in the advertisement slot can be provided to the advertisement management system 110. Similarly, a search query 116 for which search results are requested can also be provided to the advertisement management system 110.

In response to the request for advertisements, the advertisement management system 110 can select, for presentation, advertisements having characteristics matching the characteristics of advertisement slots and that are identified as relevant to the search queries 116. The data representing the request for advertisements as well as data representing the selected advertisements and user actions (e.g., selections and conversions) taken in response to the selected advertisements being presented can be stored in a historical data store 119. For example, data representing each search query for which advertisements have been requested can be indexed in the historical data store 119 with data identifying the advertisements that were selected for the search query and advertisement performance data for the advertisement.

In some implementations, advertisements having or associated with targeting keywords that match the search query 116 are the advertisements selected by the advertisement management system 110 to be provided with the resource. A targeting keyword matches a search query by having the same textual content ("text") as the search query. For example, an advertisement associated with the targeting keyword "football" can be selected for presentation with a search results page provided for the search query "football." A targeting keyword also matches a search query by having text that is identified as being relevant to a targeting keyword or search query despite having text different from the targeting keyword. For example, an advertisement having the targeting keyword "football" may also be selected for presentation in response to a search query for "sports" because football is a type of sport, and, therefore, is relevant to the term "sports." Search queries that are relevant to particular targeting keywords can be identified, for example, using clustering techniques to cluster terms according to a measure of similarity. For example, a search query term that is in the same cluster as a targeting keyword for an advertisement can be identified as relevant to the targeting keyword, thereby making the advertisement available for presentation in response to the search query. Similarly, advertisements can be made available for presentation in response to receiving other search query terms that are identified as relevant to or semantically related to the targeting keyword for the advertisement.

In some situations, search queries that are provided by users requesting content to satisfy the user's need for information, may not match targeting keywords that are specified for advertisements that are relevant to the content being requested. Therefore, it can be difficult to select for presentation content relevant to the informational need being expressed with the search query.

Figure 1B:
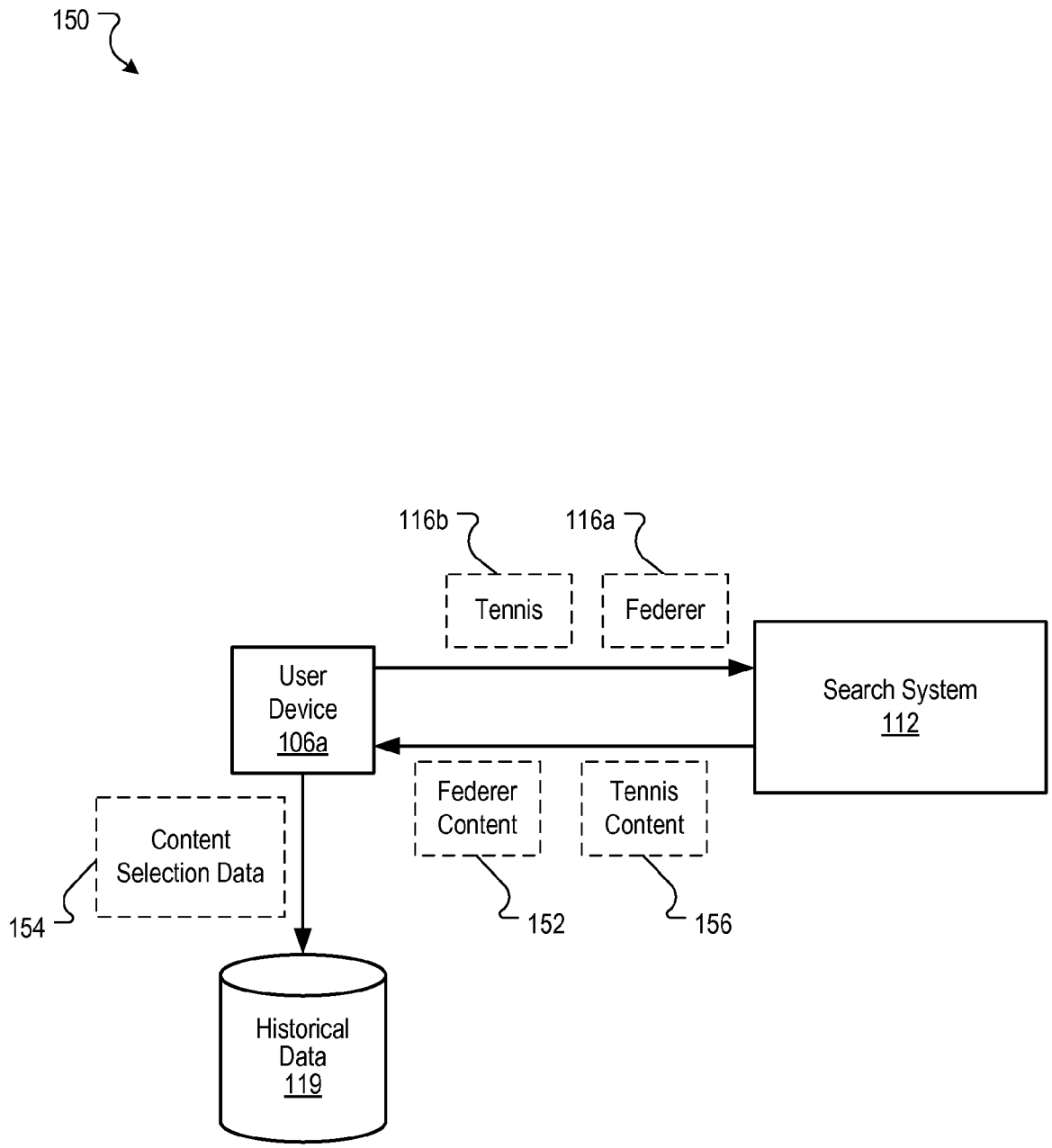
FIG. 1B is a block diagram illustrating example user interactions with a search system.

FIG. 1B is a block diagram 150 illustrating example user interactions with a search system 112. A user controlling user device 106a may submit the search query "federer" 116a to a search system 112 to request content to satisfy a need for information about Roger Federer and/or tennis. However, much of the content identified as relevant to the tennis player Roger Federer and/or tennis may not have targeting keywords or other content selection criteria that are matched by the search query "federer" 116a. Therefore, the user device 106a may be provided very little or no "federer content" 152 (i.e., content that is relevant to the search query "federer"). Alternatively, the user device 106a may be provided "federer content" 152 that does not satisfy the user's need for information. In turn, the user may select very little content that is presented in response to the search query, or select nothing at all. Content selection data 154 representing user selections of content provided in response to the search query can be stored in the historical database 119.

After reviewing and/or making selections of content from the "federer content" 152 provided in response to the search query "federer" 116a, the user may submit a different query in hopes of identifying content that better satisfies the user's need for information. For example, the user operating user device 106a may submit the search query "tennis" 116b. The search query "tennis" 116b may match targeting keywords for content that is relevant to tennis and/or Roger Federer, causing the "tennis content" 156 (i.e., content relevant to the search query "tennis") to be presented to the user by the user device 106a. Again the user reviews the "tennis content" 156 and may select some advertisements and/or other content from the "tennis content" 156 presented in response to the search query "tennis" 116b, and content selection data 156 can be stored in the historical database 119. However, if the "tennis content" 156 still does not provide content that fully satisfies the user's need for information, the user may continue to submit additional search queries 116 that the user associates with the content for which the user is searching.

Content that more adequately satisfies a user's need for information is more likely to be selected by a user than content hat less adequately satisfies the user's need for information. Therefore, when a user provides a search query that matches targeting keywords (or other selection criteria) for content that more adequately satisfies the user's need for information, the user is more likely to select more advertisements and other content provided in response to the search query. Accordingly, content performance measures (e.g., numbers of selections or selection rates) for content that more adequately satisfies a users need for information will be higher than performance measures for content that less adequately satisfies the user's need for information. Thus, the performance measures of advertisements or other content that are provided responsive to a search query is an indication of how well the content responsive to the search query satisfy the user's need for information.

A user that is submitting multiple search queries requesting content for a same informational need is likely to submit these queries at a faster rate than the rate with which the user will submit queries that are requesting content related to different informational needs. Continuing with the example above, the user that is searching for particular tennis content may submit several different search queries that the user associates with the tennis content, but that may not match targeting keywords (or other selection criteria) for the tennis content very well. Therefore, the user may submit a new query for the tennis content very soon after submitting the previous query. However, once the user has found content for which the user was searching, the user will likely spend more time viewing the content, and is also less likely to submit additional search queries requesting the tennis content. Thus, the more proximate (e.g., in time or events) that two search queries are received from a user, the more likely it is that the two search queries are requesting content to satisfy the same informational need.

Although users can iteratively submit search queries in an effort to choose a search query that matches selection criteria of content in which the users are interested, users may end the search session before finding the content for which they were searching. To reduce the likelihood of users terminating search sessions prior to finding content that satisfy their information needs, query rules can be generated that specify additional terms that can be used for identifying content when search queries having low-performing queries are received. These query rules can specify, for example, that content be identified for high-performing queries that have previously been received within a threshold period of the low-performing query by at least a threshold number of users.

The advertisement management system 110 includes an analysis subsystem 120 that includes one or more processors configured to generate query rules based on an analysis of received search queries and content selection data corresponding to the received search queries. The query rules generated by the analysis subsystem 120 specify terms, in addition to the search queries, that can be used for identifying content responsive to received search queries. The advertisement management system 110 can store and index the query rules in a rule data store 122 and provide query rules, for example, to the advertisement management system 110 (or other query processing devices) to facilitate identification of advertisements (or other content) that are relevant to content being requested by the search query.

Figure 2:
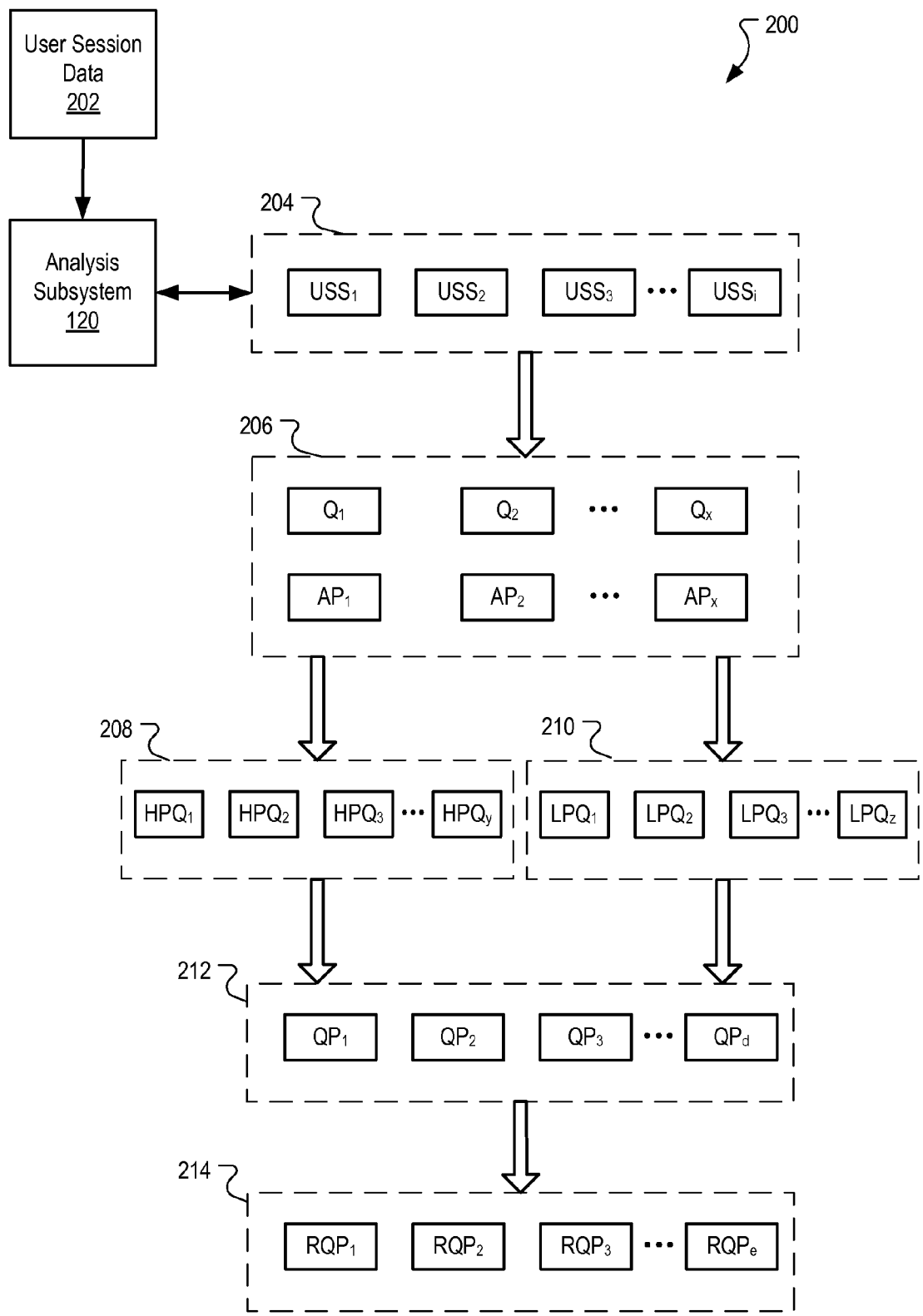
FIG. 2 is a block diagram of an example process flow for generating query rules for search queries based on content selection data.

FIG. 2 is a block diagram of an example process flow 200 for generating query rules for search queries based on content selection data. The analysis subsystem 120 receives user session data 202 as input. The analysis subsystem 120 receives user session data, for example, from a data store storing user session data that was logged during user sessions, such as the historical data store 119 of FIG. 1.

A user session is a period of time over which data received from a particular user device (or group of user devices) are grouped together. The user session data 202 for each user session can include, for example, data representing received search queries and corresponding user actions over a specified period (e.g., a time period or a threshold number of actions or occurrences). For example, user session data for an individual user session may include data representing all search queries received from a user (or group of users) over a twenty-four hour time period and data representing all advertisements (or other content) that were selected from search results pages for the search queries.

The user session data 202 also includes timing information specifying a time at which each search query was received and a time at which each advertisement was selected during the user session. The timing information can be a time of day (e.g., Greenwich Median Time) or a relative time within the user session (e.g., an amount of time after a beginning time for the user session).

The user session data for each user session can be associated with an anonymized identifier that corresponds to the user session to which the data belongs and indexed based on the anonymized identifier. The anonymized identifier can be, for example, a hash of an Internet Protocol address, user identifier, or other identifier so that the user session data corresponding to the anonymized identifier is not attributable to an identifiable user, but is still identified as being from the same user (or group of users) for processing the data.

The analysis subsystem 120 segments the user session data (e.g., for each user session) into user session subsets 204. Each user session subset (e.g., USS1-USSi) includes a unique subset of the user session data 202 that can be selected for inclusion in the subset using the timing information. For example, each user session subset can include a disjointed subset of the user session data that is delineated by a session delineator.

The session delineator defines a characteristic of the user session data by which the user session data is segmented. The session delineator can be, for example, a threshold time period within which search queries that are requesting content for a same informational need are received. The threshold time period can be determined on a user by user basis, as described with reference to FIG. 3. Additionally, other delineators can be used for segmenting the user session data (e.g., a number of events).

The analysis subsystem 120 identifies, for each user session subset (USS1 . . . USSi), a dataset 206 that includes search queries (e.g., Q1 . . . Qx) received during the user session subset (e.g., USS1) and corresponding advertisement performance measures (e.g., AP1 . . . APx) for each of the queries. The advertisement performance measure is a measure of advertisement performance for the advertisements presented with search queries. The advertisement performance measure can be provided with the user session data 202 or computed based on other advertisement performance data included with the user session data 202. For example, a selection rate for the advertisement can be computed based on a total number of selections for the advertisement relative to a total number of presentations for the advertisement, where the total number of selections and the total number of presentations can be represented by data included with the user session data.

The analysis subsystem 120 analyzes the advertisement performance measures for the queries (e.g., Q1 . . . Qx) and classifies each of the queries to a particular query performance group based on the advertisement performance measure for the query. For example, the analysis subsystem 120 can identify queries having at least a threshold advertisement performance as high-performing queries (e.g., HPQ1 . . . HPQx) that are classified in a high-performing query group 208. Similarly, the analysis subsystem 120 can identify queries having less than the threshold advertisement performance as low-performing queries (e.g., LPQ1 . . . LPQz) that are classified in a low-performing query group 210.

Once the queries have been classified, the analysis subsystem 120 defines initial query pairs 212, where each initial query pair (e.g., QP1 ... QPd) includes a high-performing query (e.g., HPQ1) and a low-performing query (e.g., LPQ1) that corresponds to a same user session subset (e.g., USS1). For example, each initial query pair for a particular user session subset can include one high-performing query from the user session subset and one low-performing query for the user session subset.

In some implementations, the initial query pairs for a user session subset include initial query pairs resulting from a permutation of the queries classified to the high-performing query group 208 and the queries classified to the low-performing query group for the user session subset. For example, the high-performance query HPQ1 can be paired with each of the low-performance query pairs LPQ1 ... LPQz to generate z initial query pairs (i.e., HPQ1:LPQ1 ... HPQ1:LPQz, where each HPQ:LPQ represents a unique initial query pair).

Once the initial query pairs 212 have been defined for the user session subsets, the analysis subsystem 120 computes a number of user session subsets for which each of the initial query pairs is defined. Initial query pairs that are defined for and/or identified in at least a threshold number of user session subsets are selected to be reference query pairs 214. Thus, each reference query pair (e.g., RQP1 ... RQPe) specifies a high-performing query (e.g., HPQ1) and a low-performing query (e.g., LPQ1) that are defined for at least the threshold number of user session subsets. The threshold number of user session subsets can be selected, for example, based on query quality goals and available processing resources, as described in more detail with reference to FIG. 3.

Using the reference query pairs 214, the analysis subsystem 120 defines query rules that are used to identify additional content (e.g., advertisements or search results) for search queries. In some implementations, each query rule specifies a high-performing query that can be used to identify content when the corresponding low-performing query is received as a search query. For example, a query rule defined based on reference query pair RPQ1 can specify that the high-performing query (e.g., HPQ1) that is included in RPQ1 can be used to identify content in response to receipt, as a search query, of the low-performing query included in RPQ1 (e.g., LPQ1). Thus, content responsive to the high-performing query can be provided to a user to increase the likelihood that content that satisfies the user's informational need is provided to a user in response to receiving a low-performing query as a search query.

The query rules can be stored in a data store for access by a query processing system and/or provided to a query processing system to facilitate identification of content for presentation in response to a search query. For example, in response to a query processing system receiving a search query, the query processing system can request from the data store a query rule corresponding to the search query.

Figure 3:
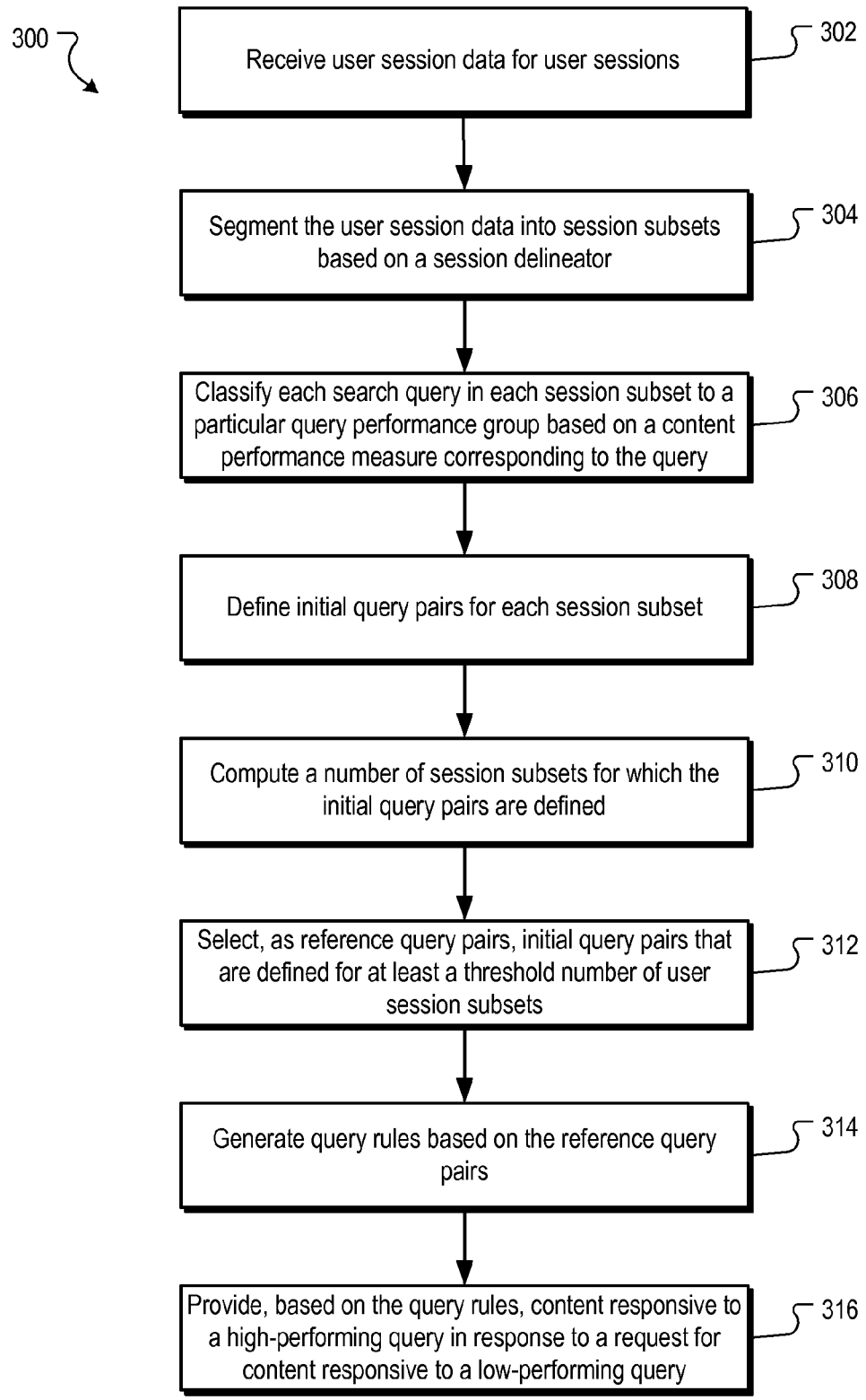
FIG. 3 is a flow chart of an example process for generating query rules based on content performance data corresponding to search queries.

FIG. 3 is a flow chart of an example process 300 for generating query rules based on content performance data corresponding to search queries. The process 300 receives user session data for user sessions, where the user session data for each user session includes search queries received during the user session and content performance data for content provided during the user session. The user session data are segmented into user session subsets based on a session delineator so that each user session subset includes search queries that were received within a threshold proximity of each other.

Using the content performance data, each query in each user session subset is classified as a high-performing query or a low-performing query and initial query pairs are defined so that each initial query pair includes a high-performing query from a user session subset and a low-performing query from the same user session subset. A number of user session subsets for which each initial query pair is defined is computed, and initial query pairs that are defined for at least a threshold number of user session subsets are selected as reference query pairs. In turn, query rules are generated using the reference query pairs, and based on the query rules, content responsive to a high-performing query is provided in response to receipt of a search query specifying a low-performing query.

The process 300 can be implemented, for example, by the analysis subsystem 120 of FIG. 1. In some implementations, the analysis subsystem 120 includes one or more processors that are configured to perform actions of the process 300. In other implementations, a computer readable medium can include instructions that when executed by a computer cause the computer to perform actions of the process 300.

User session data for user sessions are received (302). In some implementations, the user session data for each user session includes search queries received during the user session and content performance data corresponding to the search queries. The content performance data can represent, for example, user actions detected in response to content being provided to a user device in response to a search query.

For example, the content performance data can include data representing user selections of advertisements (or other content) that are presented with a search results page providing search results responsive to a search query submitted by a user. The data representing user selections of the advertisements can be, for example, data identifying a number of clicks (or a click-through-rate) for each individual advertisement provided with the search results page or an aggregate number of clicks for the advertisements provided. Additionally, the content performance data can include data representing conversions or other performance measures for the advertisements.

The content performance data can also include timing information that specifies a time at which each search query was received. As described above, the timing information can be a time of day or a relative time within the user session at which the search query was received. The search queries and corresponding performance data can be received, for example, from a data store storing logged and/or indexed data from user sessions, such as the indexed cache 114 of FIG. 1.

In some implementations, user session data for each user session is identified as belonging to the user session based on a unique identifier for the user session. For example, each user session can have an identifier that is associated with data that is received or computed during the user session. As described above, the user session data for a particular user session can be an anonymized identifier that is computed based on data associated with the user session. For example, the anonymized identifier can be a hash of an Internet Protocol address associated with the user device corresponding to the user session data or a hash of a value of a cookie associated with the user device.

The user session data is segmented into session subsets based on a session delineator (304). In some implementations, each session subset includes search queries that were received within a threshold proximity of other search queries in the session subset, where the threshold proximity is specified by the session delineator.

For example, the session delineator can specify the threshold proximity as a maximum time or a maximum number of events that can elapse or occur between receipt of each of the queries in each session subset. As described above, queries that are received within a shorter time (or number of events)

of each other are more likely requesting content for a same user informational need than queries that are received after a longer time. Thus, a session delineator that specifies a shorter time (or number of events) can result in user session subsets that include search queries that are more relevant to each other than the search queries included in user session subsets that result from a session delineator that specifies a longer time.

In some implementations, the session delineator is selected to be less than an average elapsed time (or average number of events) within which queries are received during a particular user session. For example, when user session data for a particular user session indicates that search queries are received every ten minutes on average, the session delineator may be selected as five minutes such that queries received within five minutes of each other are included in the same user session subset. Thus, in this example, any query that is received within five minutes of another query will be included in the same user session subset as the other query.

In some implementations, it is possible that a query may be included in more than one user session subset. Continuing with the example above, if a first query A is received and another query B is received within five minutes of query A, then query A and query B will be included in the same user session subset. If another query C, is then received more than five minutes after query A but less than five minutes after query B, then queries B and C will be included in another query session subset. In these implementations, each of the user session subsets includes a unique set of search queries because each user session subset will have at least one query different from every other user session subset.

In other implementations, each user session subset can be a disjointed subset so that each search query is included in only one user session subset. For example, the user session subset can be used to segment user session data at five minute intervals starting, for example, from a time at which a first search query of the user session is received (or another reference time). Thus, in these implementations each search query having the same unique session identifier as the first received search query and received within five minutes of the first received search query can be grouped together the same user session subset. Each search query having the same unique session identifier as the first received query and received between five and ten minutes after receipt of the first received search query can be grouped together in another user session subset.

Two particular ways of segmenting the user session data have been provided, but others are also possible. For example, the session delineator can be used in combination with a subset limiter that reduces the number of user session subsets by requiring a candidate query that is eligible for inclusion in more than one user session subset to be included only in the user session subset that includes a most proximate search query to the candidate query. Alternatively, the subset limiter can require that the candidate query only be included in both user session subsets when the candidate query is received within a narrower time (or number of events) than that specified by the session delineator.

In some implementations, each user and/or each user session can have a session specific session delineator. For example, the session delineator for each user session can be computed based on an average time (or number of events) that elapses between receipt of queries during the user session. Thus, the session delineator for each user session can be computed based on an analysis of the user session data corresponding to the unique identifier for the user session.

Computing the session delineator for each user session based on the user session data corresponding to the user session increases the likelihood that queries included in the same user session subset are requesting content for a same user informational need. For example, one user may have an average query submission rate that is twice as fast as another user. Therefore, if the session delineator that is computed for the user that submits queries more slowly ("user 1") is used to segment user session data for the user that submits queries more quickly ("user 2"), it is more likely that the user session subsets for user 2 will include search queries that are less relevant to each other than those in the user session subsets for user 1.

Each search query in each session subset is classified to a particular query performance group based on a content performance measure corresponding to the search query (306). In some implementations, the content performance measure is included with the content performance data corresponding to the search query and received from a data store, such as the historical data store 119 of FIG. 1. In other implementations, the content performance measure is computed based on the content performance data corresponding to the search queries.

Content performance measures for a search query can be computed as an aggregate performance (e.g., selections or selection rate) of content provided in response to the search query. For example, the content performance measure for a particular query can be a total number of advertisements that were selected from search result pages for the search query. Alternatively, the content performance measure for the particular query can be a selection rate of advertisements from the search results pages that is computed based on a total number of times the search result was received (i.e. a total number of instances of the search query) or a total number of advertisements that were presented with the search results page.

The content performance measure for each search query is compared to a threshold content performance. Search queries for which the content performance measure exceeds the threshold content performance are classified as high-performing queries and search queries for which the content performance measure does not exceed the content performance threshold are classified as low-performing queries.

In some implementations, performance measures for content provided in response to a search query can be normalized based on characteristics of the content that was selected. For example, the performance measures can be normalized to account for differences in presentation positions (i.e., presentation characteristics) for the content as well as inherent characteristics (e.g., size, color animation status) of the content. The normalization can be performed by applying a normalization factor to the performance measures.

A normalization factor is a value that adjusts a performance measure so that each performance measure more accurately reflects the relevance of the content to the search query for which it was provided. For example, content is sometimes presented in different locations of a Web page based on its relevance to the search query for which the content was provided. Therefore, content that is selected from a location that is reserved for more relevant content provides a stronger signal that the search query provides content that satisfies the user's informational need than selection of content from another location in which less relevant content can be presented.

Two particular forms of content that are sometimes presented in different locations of a Web page based on their relevance to a search query are search results and advertisements. Search results are often presented in descending order of relevance in a search results page and advertisements can be selected for presentation in advertisement slots based, in part, on how well the targeting keywords match the search query. Thus, a selection of one advertisement may provide a stronger signal that content identified as relevant to the search query satisfies the user's informational need than selection of another advertisement.

For example, a selection of an advertisement in a top banner position of a Web page (i.e., an advertisement slot positioned across the top center of the Web page that can be reserved for advertisements that have at least a threshold relevance measure relative to the search query) may be more indicative that content identified as relevant to the search query satisfies the user's informational need than a selection of an advertisement in the bottom right corner of the Web page. Thus, a search query having a same content selection rate as another search query, but having a higher top banner advertisement selection rate may be identified as a higher performing query than the other query having a lower top banner advertisement selection rate.

Each presentation position can have a corresponding normalization factor, such that the performance data for content provided in each of the presentation positions of a web page can be normalized and used to compute normalized content performance for the search queries. Additionally, normalization factors can be specified for other characteristics of advertisements such as quality measures for the advertisements, times at which the advertisements were presented, and inherent characteristics (e.g., color, animation status, audio characteristics, and size) of the advertisements.

Initial query pairs are defined for each session subset (308). In some implementations, each initial query pair includes a high-performing query and a low-performing query, where the high-performing query and the low-performing query are selected from the same user session subset. Each high-performing query can be matched with every low-performing query in the user session subset to define a number of initial query pairs equal to a product of the number of high-performing queries and the low-performing queries in the user session subset. For example, assume that a user session subset includes two high-performing queries (e.g., queries 1 and 2) and three low-performing queries (e.g., queries 4, 5, and 6). In this example, the initial query pairs can be every permutation of the high-performing queries and the low-performing queries (e.g., query1:query3; query 1:query5; query 1:query6; query2:query3; query2:query4; and query2:query5).

A number of session subsets for which the initial query pairs are defined is computed (310). In some implementations, the computed number of session subsets is a total number of instances of the initial query pair across all user session subsets for all user sessions over a specified time period. For example, the number of session subsets can be a number of session subsets in which the initial query pair is defined over a previous 3 months, a previous 6 months, or another specified time period.

In other implementations, the number of session subsets is computed to be a number of different user sessions, or user sessions corresponding to different user devices, in which the initial query pair is defined. For example, the number of session subsets can be a total number of unique user sessions in which the initial query pair is defined.

Initial query pairs that are defined in at least a threshold number of user session subsets are selected as reference query pairs (312). In some implementations, the threshold number of user session subsets is selected so that at least a threshold portion of the queries in the reference query pairs are received with at least a threshold frequency (i.e., a minimum rate of receipt as a search query). For example, the threshold number of user sessions can be set to a value so that at least 90% of the queries in the reference query pairs have a receipt frequency within the top 50% of all received queries.

As the threshold number of user session subsets is increased, the likelihood that the search queries in the reference query pairs will have receipt frequencies that are above the threshold frequency increases. Similarly, as the threshold number of user session subsets is decreased, the likelihood that the search queries in the reference query pairs will have receipt frequency that is below the threshold frequency increases because the initial query pairs that qualify as reference query pairs are required to be identified in fewer of the user session subsets.

In some implementations, the threshold number of user session subsets can be iteratively adjusted until the threshold portion in the reference query pairs have a receipt frequency that meets that threshold frequency. For example, the initial threshold number of user session subsets may be set at 500, such that each initial query pair that is defined for at least 500 different user session subsets (or unique user sessions) is selected as a reference query. At this initial threshold several thousand reference query pairs may be identified. Each of the queries in the reference query pairs can be analyzed to determine a receipt frequency (or total number of times the query has been received) over a specified time.

If more than the threshold portion (e.g., 90%) of the queries in the reference query pairs have a receipt frequency that meets the threshold frequency (e.g., a receipt frequency within the top 50% of all queries) the threshold can be lowered. For example, the threshold number of user session subsets can be lowered 300 different user session subsets (or unique user sessions). When the threshold is lowered, more initial query pairs will satisfy this lower threshold and be defined as reference query pairs. Therefore, more low-performing search queries will be eligible for query rule definition.

The reference query pairs at the new threshold of 300 user session subsets are analyzed to determine whether the threshold portion of queries in the reference query pairs have receipt frequencies that satisfy the frequency threshold, as described above. If so, the threshold number of user session subsets can continue to be lowered until the threshold portion of the queries in the reference query pairs are do not have receipt frequencies that meet the threshold frequency. In turn, the threshold can then be raised to a level at which the threshold portion of queries in the reference query pairs have at least the threshold receipt frequency.

Adjusting the threshold user session subsets as described above increases the number of low-performing queries for which query rules will be defined, while ensuring that processing resources are not used to generate query rules for search queries that are only rarely received.

Query rules are generated based on the reference query pairs (314). In some implementations, each query rule specifies a high-quality query for which content can be identified in response to receiving a low-quality query. The high-quality query and corresponding low-quality query specified by a query rule can be, for example, a high-quality/low-quality query pair that define a reference query pair. The query rules can be stored, for example, in a data store that stores query rules, such as the rule data store 122 of FIG. 1.

Content responsive to a high-performing query is provided in response to a request for content responsive to a low-performing query based on the query rules (316). In some implementations, the low-performing query is received as a search query that was submitted by a user device. In response to receiving the low-performing query, a query rule corresponding to the low-performing query can be identified or requested. Using the high-performing query that is specified by the query rule corresponding to the low-performing query, content is identified for presentation to the user device. In turn, the identified content is provided to the user device. Thus, the content provided to the user device in response to receipt of a low-performing search query can include content that is identified based on the high-performing query, and that may not have been identified based on the low-performing query.

The content provided in response to the low-performing query can include, for example, advertisements having targeting keywords that match the high-performing query of the query rule, search results, provided by a search engine, that are identified based on the high-performing query, or other content (e.g., video or audio) that are identified as relevant to the high-performing query. Thus, the criteria (e.g., search queries) with which content is selected for presentation in response to a received search query are expanded to include the high-performing query of the query rule corresponding to the low-performing query.

The query rules can be used by a variety of query processing systems such as search engines, video or audio search tools that provide suggested video and or audio in response to queries, and advertisement management systems that select advertisements for presentation with content.

Figure 4:
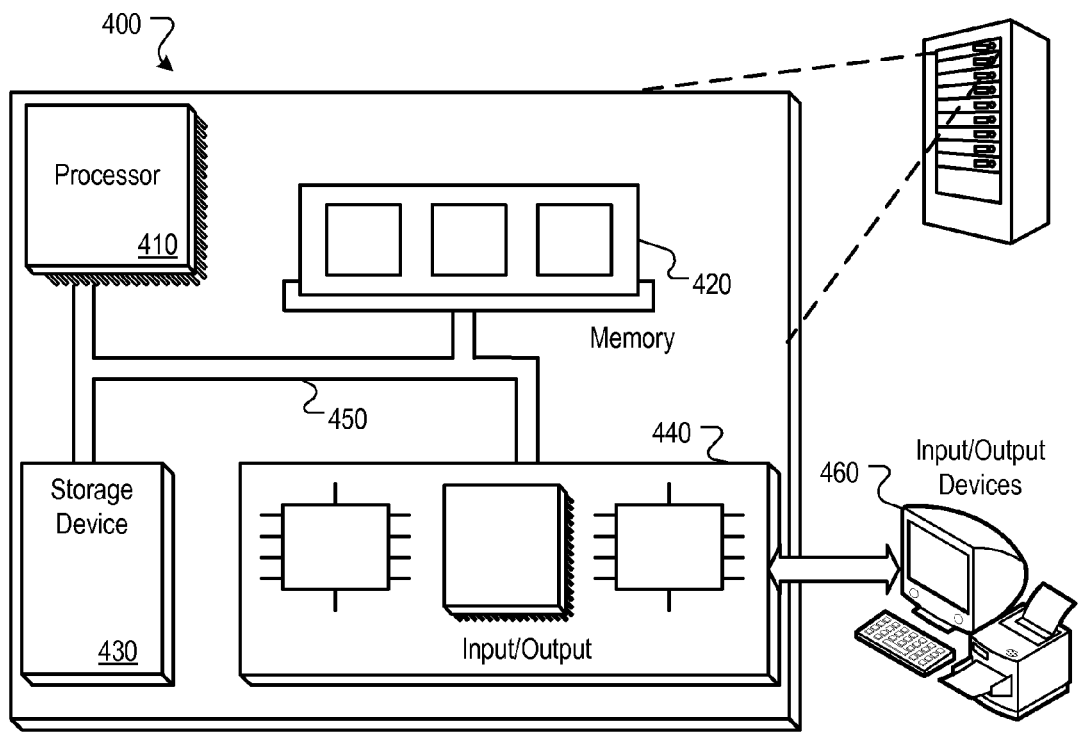
FIG. 4 is a block diagram of an example computer system that can be used to facilitate content selection data expansion and content selection.

FIG. 4 is a block diagram of an example computer system 400 that can be used to facilitate content selection data expansion and content selection. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

The analysis subsystem 120 can be realized by instructions that upon execution cause one or more processing devices to carry out the processes and functions described above. Such instructions can comprise, for example, interpreted instructions, such as script instructions, e.g., JavaScript or ECMA-Script instructions, or executable code, or other instructions stored in a computer readable medium. The analysis subsystem 120 and/or advertisement management system 110 can be distributively implemented over a network, such as a server farm, or can be implemented in a single computer device.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, in a data processing device, user session data for a plurality of user sessions, the user session data for each user session including search queries and corresponding content performance data for the user session, the content performance data representing user actions in response to content being provided responsive to the search queries;
    segmenting, by a data processing device, the user session data into session subsets based on a session delineator, each session subset including search queries that were received within a threshold proximity of other search queries in the session subset, the threshold proximity being specified by the session delineator;
    classifying, by a data processing device, each search query as belonging to a particular query performance group based on an advertisement performance measure corresponding to the search query, the advertisement performance measure being computed based on the content performance data corresponding to the search query, wherein classifying each search query to a particular query performance group comprises:
        classifying each search query having an advertisement performance measure that meets an advertisement performance threshold as a high-performing query and as belonging to a high-performing query group; and
        classifying each search query having an advertisement performance measure that is less than the advertisement performance threshold as a low-performing query and as belonging to a low-performing query group;
    selecting, by a data processing device, reference query pairs, each reference query pair including a high-performing query from the high-performing query group and a low performing query from the low-performing query group, each reference query pair being a query pair that is defined for at least a threshold number of session subsets;
    generating, by a data processing device, query rules based on the reference query pairs, each query rule specifying that content responsive to a high-performing query from a reference query pair be identified in response to receipt of a low-performing query from the reference query pair; and
    providing, by a data processing device and based on the query rules, content responsive to a high-performing query specified by a query rule in response to receipt of a low performing query specified by the query rule.

2. The method of claim 1, further comprising computing, for each search query, an advertisement performance measure based on a number of selections of advertisement provided responsive to the search query, the number of selections being computed based on the content performance data corresponding to the search query.

3. The method of claim 2, wherein computing an advertisement performance measure comprises computing a selection rate for advertisements provided responsive to the search query.

4. The method of claim 3, wherein computing a selection rate comprises computing, for each search query, a normalized selection rate based on a number of instances of the search query and presentation characteristics for the advertisements.

5. The method of claim 4, wherein computing a normalized selection rate comprises normalizing the selection rate based on presentation positions for the advertisements, each presentation position having a corresponding normalization factor with which the normalized selection rate is computed for advertisements presented in the presentation position.

6. The method of claim 1, wherein selecting reference query pairs comprises:
    defining, for each session subset, initial query pairs, each initial query pair including a high-performing query and a low-performing query;
    determining, for each initial query pair, a number of session subsets for which the initial query pair is defined; and
    selecting, as reference query pairs, initial query pairs that are defined for at least a threshold number of session subsets.

7. The method of claim 1, wherein segmenting the user session data into session subsets comprises:
    selecting, for each user session, a session specific delineator specifying a threshold proximity with which the session subsets for the user session are defined; and
    segmenting the user session data for the user session based on the session specific delineator.

8. The method of claim 7, wherein selecting a session specific delineator comprises:
    identifying user session data for user sessions corresponding to a same unique identifier; and
    computing a session delineator for user session data corresponding to the same unique identifier based on an analysis of the user session data.

9. The method of claim 8, wherein computing the session delineator comprises computing an average elapsed time between receipt of queries corresponding to the unique identifier, and wherein segmenting the user session data based on the session specific delineator comprises grouping search queries that correspond to the unique identifier and are received within a query period of each other into a same session subset.

10. A system, comprising:
    a data store storing user session data for a plurality of user sessions, the user session data for each user session including search queries received from user devices during the user session and content performance data corresponding to each of the search queries; and
    a query analysis subsystem coupled to the data store, the query analysis subsystem including one or more processors configured to receive the user session data from the data store, segment the user session data into user session subsets based on a session delineator, and generate query rules, where each query rule specifies a high-performing query with which content is identified in response to receipt a low-performing query specified by the query rule, the high-performing query being a query having a content performance measure that meets a threshold content performance and belonging to user session subset as the low-performing query specified by the query rule, the low-performing query having content performance measure that does not meet the threshold content performance, the session delineator specifying a threshold proximity within which each search query in a user session subset is received relative to the receipt of other search queries in the user session subset.

11. The system of claim 10, wherein the query analysis subsystem is configured to provide content responsive to a high-performing query in response to receipt of a low-performing query specified by a query rule.

12. The system of claim 10, wherein the query analysis subsystem is configured to compute content performance measures for search queries based on the content performance data corresponding to the search queries, classify search queries having content performance measures that meet a threshold content performance as high-performing queries, and classify search queries having content performance measures that are less than the threshold content performance as low-performing queries.

13. The system of claim 12, wherein the query analysis subsystem is configured to define initial query pairs for each user session subset, each initial query pair including a high-performing query and a low-performing query from the same user session subset.

14. The system of claim 10, wherein the query analysis subsystem is configured to segment the user session data into user session subsets based on session specific delineators, where each session specific delineator specifies a threshold proximity with which user session subsets are defined for a corresponding user session.

15. The system, of claim 14, wherein the query analysis subsystem is configured to compute the session specific delineator for each user session based on an average elapsed time between receipt of queries during the user session.

16. A non-transitory computer readable medium encoded with a computer program comprising instructions that when executed operate to cause a computer system to perform operations comprising:
receiving user session data for a plurality of user sessions, the user session data for each user session including search queries and corresponding content performance data for the user session, the content performance data representing user actions in response to content being provided responsive to the search queries;
segmenting the user session data into session subsets based on a session delineator, each session subset including search queries that were received within a threshold proximity of other search queries in the session subset, the threshold proximity being specified by the session delineator;
classifying each search query as belonging to a particular query performance group based on an advertisement performance measure corresponding to the search query, the advertisement performance measure being computed based on the content performance data corresponding to the search query, wherein classifying each search query to a particular query performance group comprises:
classifying each search query having an advertisement performance measure that meets an advertisement performance threshold as a high-performing query and as belonging to a high-performing query group; and
classifying each search query having an advertisement performance measure that is less than the advertisement performance threshold as a low-performing query and as belonging to a low-performing query group;
selecting reference query pairs, each reference query pair including high-performing query from high-performing query group and a low performing query from the low-performing query group, each reference query pair being a query pair that is defined for at least a threshold number of session subsets;
generating query rules based on the reference query pairs, each query rule specifying that content responsive to a high-performing query from a reference query pair be identified in response to receipt of a low-performing query from the reference query pair; and
providing, based on the query rules, content responsive to a high-performing query specified by a query rule in response to receipt of a low-performing query specified by the query rule.

17. The computer readable medium of claim 16, further comprising instructions that when executed cause the computer to perform operations comprising:
defining, for each session subset, initial query pairs, each initial query pair including a high-performing query and a low-performing query; and
determining, for each initial query pair, a number of session subsets for which the initial query pair is defined,
wherein selecting reference query pairs comprises selecting, as reference query pairs, initial query pairs that are defined for at least a threshold number of session subsets.

18. A computer-implemented method comprising:
receiving, in a data processing device, user session data for a plurality of user sessions, the user session data for each user session including search queries and corresponding content performance data for the user session, the content performance data representing user actions in response to content being provided responsive to the search queries;
segmenting, by a data processing device, the user session data into session subsets based on times at which search queries are received during user sessions, each session subset including search queries that were received within a specified time of other search queries in the session subset;
computing, by a data processing device and for each search query, a content performance measure based on a number of selections of content provided responsive to the search query, the number of selections being computed based on the content performance data corresponding to the search query;
classifying, by a data processing device, each search query having a content performance measure that meets a content performance threshold as a high-performing query and as belonging to a high-performing query group;
classifying, by a data processing device, each search query having a content performance measure that is less than the content performance threshold as a low-performing query and as belonging to a low-performing query group;
selecting, by a data processing device, reference query pairs, each reference query pair including a first search query from the low-performing query group and a second search query from the high-performing query group, the first search query and the second search query being included in a same user session subset, each reference query pair being a query pair that is defined for at least a threshold number of session subsets;
generating, by a data processing device, query rules based on the reference query pairs, each query rule specifying that content responsive to a second query from a reference query pair be identified in response to receipt of a first query from the reference query pair; and
providing, by a data processing device and based on the query rules, content responsive to a second query specified by a query rule in response to receipt of a first query specified by the query rule.

19. The method of claim 18, wherein selecting reference query pairs comprises:
defining, for each session subset, initial query pairs, each initial query pair including a high-performing query and a low-performing query from a same user session subset;
determining, for each initial query pair, a number of session subsets for which the initial query pair is defined; and
selecting, as reference query pairs, initial query pairs that are defined for at least a threshold number of session subsets.

* * * * *